DONALD J. ASENBAUER
INVENTOR.

BY Beehler & Arant

ATTORNEYS

DONALD J. ASENBAUER
INVENTOR.

BY Beehler & Arant
ATTORNEYS

DONALD J. ASENBAUER
INVENTOR.

BY Beehler & Arant
ATTORNEYS

United States Patent Office 3,421,656
Patented Jan. 14, 1969

1

3,421,656
STACKING AND NESTING CONTAINERS WITH
RETRACTING STACKING BAIL
Donald J. Asenbauer, Whittier, Calif., assignor to Shell
Oil Company, New York, N.Y., a corporation of
Delaware
Continuation-in-part of application Ser. No. 547,000,
May 2, 1966. This application Feb. 6, 1968, Ser.
No. 703,856
U.S. Cl. 220—97                                14 Claims
Int. Cl. B65d 21/00

ABSTRACT OF THE DISCLOSURE

A thin-walled plastic container having side and end walls which are turned over to form a generally horizontal rim, and then turned downwardly to form a rim flange such that downwardly opening channels are formed beneath the rim and rim flange; and stacking bails associated with the container; each stacking bail consisting of a rigid metal rod having ends turned back almost upon itself but defining a gap such that when the bail rests across the rim surfaces of the side walls of the container the inturned ends of the bail then encircle the rim flange and extend upwardly into the associated channel; the stacking bails being adapted for longitudinal sliding movement on the container to permit both stacking and nesting positions of the container.

---

This application is a continuation-in-part of Serial No. 547,000 filed May 2, 1966, now abandoned.

Background of the invention

*Field of the invention.*—This invention relates generally to containers and, more particularly, to an improved stacking and nesting container with retractable stacking bails.

*Prior art.*—Many containers, particularly large reusable handling containers for holding articles during storage and shipment, are designed to be stacked one on top of the other when loaded and nested one inside the other when empty. Some containers of this kind must be cross stacked. Cross stacking involves relative positioning of the adjacent stacked containers in such manner that each container rests on the upper edges of the side walls of the adjacent lower container. Other containers are equipped with retractable stacking supports, or bails as they are referred to herein, which extend across the open top of the container. These stacking bails are laterally movable endwise of the container between nesting positions adjacent the container end walls and stacking positions spaced inwardly from these walls. When in nesting position, the bails are disposed to receive therebetween the bottom of a similar container, thus to permit a number of the containers to be netsed one inside of the other. The stacking bails, when in stacking position, are disposed for engagement with the bottom wall of a similar container in such a way that a number of the containers may be stacked one on top of the other. My co-pending application Ser. No. 480,271 filed Aug. 17, 1965, now U.S. Patent No. 3,379,339 and entitled "Stackable Container Having Movable Support Members," discloses novel stacking and nesting containers of this latter type.

Summary of the invention

The present invention provides a further improved stacking and nesting container with retractable stacking bails which is superior to my prior containers in certain respects. Briefly, the containers of my co-pending application comprise a rectangular container body which may be conveniently fabricated from plastic by a simple

2 vacuum forming process. The retractable stacking bails, which may be metal rods, extend across the open top of the container and have their ends disposed within longitudinal slots in the container side walls. Fitted on the outboard ends of the bails, outwardly of the side walls, are thrust washers. These thrust washers serve the dual function of restraining the bails against endwise movement from the container slots and resisting outward deflection of the container side walls under the lateral force components exerted on these walls when a number of loaded containers are stacked one on top of the other.

While the containers disclosed in my co-pending application are superior to the earlier stacking and nesting containers with retractable stacking bails, my prior containers possess certain inherent disadvantages which this invention seeks to cure. One of these disadvantages resides in the excessive manufacturing cost involved in forming the bail slots in the container side walls. Thus, these slots are produced by a machining operation which adds substantially to the overall container cost. Moreover, the slots weaken the containers and thus reduce their stacking strength. Another disadvantage of my prior stacking and nesting containers involves the thrust washers on the outboard ends of the stacking bails. Assembly of the bails on the containers and assembly of the thrust washers on the bails involve separate steps in the fabrication of the containers which increase their overall cost. This bail construction also renders difficult the replacement, particularly by the container user, of a bail which becomes bent or otherwise damaged in use. Further, when a number of loaded containers are stacked, the stacking loads on each container create lateral forces on the container side walls which urge these walls outwardly against the thrust washers. While the thrust washers are theoretically designed to resist such outward deflection of the side walls, it has been found, in practice, that the lateral forces active between the washers and side walls of lower containers in a container stack are often sufficient to either strip the washers from the bails or force the container side walls over the washers. If this occurs, the entire container stack may collapse.

It is a principal object of the present invention to provide an improved stacking and nesting container with retractable stacking bails which cures the above noted deficiencies of my prior containers.

A more specific object of the invention is to provide an improved stacking and nesting container of the character described which is devoid of bail slots in the container side walls, whereby the stacking strength of the container is increased, its fabrication is simplified, and its overall cost is reduced.

Another object of the invention is to provide an improved stacking and nesting container of the character described wherein each stacking bail comprises a one piece, unitary member which may be simply and economically formed by a simple bending operation and thereafter quickly and easily assembled on the container, thus further reducing the container cost.

A related object of the invention is to provide an improved stacking and nesting container of the character described wherein a bail which becomes bent or otherwise demaged in use may be quickly and easily replaced, even by the container user.

A further related object of the invention is to provide an improved stacking and nesting container of the character described wherein the stacking bails, while easily replaceable, are securely locked to the container in normal use in such a way as to eliminate the possibility of inadvertent or accidental disengagement of the bails from the container.

A further object of the invention is to provide an improved stacking and nesting container of the character described wherein the stacking bails are effective to reinforce the container side walls against outward deflection under the stacking loads imposed on the container in use and wherein further the bails are constructed and interlocked with the container side walls in such a way as to virtually eliminate the possibility of disengagement of the bails from the side walls under load, whereby the maximum stacking strength of the container is substantially increased.

Yet a further object of the invention is to provide an improved stacking and nesting container of the character described wherein the container body and stacking bails have unique cooperative configurations which serve the dual function of permitting easy removal of the bails from and reassembly of the bails on the container and retaining the bails in their stacking positions relative to the container body.

A still further object of the invention is to provide an improved stacking and nesting container which may be equipped with any desired number of stacking bails as required to reduce to a desired magnitude the load concentrations at the positions of supporting contact between the bails and container side walls where the stacking loads are transferred from the bails to the container side walls.

Other objects, advantages, and features of the invention will become readiy evident as the description proceeds.

With these and such other objects in view, the invention consists in the construction, arrangement, and combination of the various parts of the invention, whereby the objects contemplated are attained, as hereinafter set forth, pointed out in the appended claims and illustrated in the accompanying drawings.

*Description of the preferred embodiments*

The improved stacking and nesting container 10 of the invention which has been selected for illustration in FIGURES 1–11 of these drawings comprises a body 12 which may be conveniently fabricated from plastic by a vacuum forming process. Container body 12 has a bottom wall 14 perimetrically bounded by upstanding side and end walls 16 and 18, respectively. The container side and end walls are tapered, as shown, to permit nesting of a number of the containers in the manner hereinafter explained. Encircling the open top of the container body 12 is a rim 20 which extends outwardly from the upper edges of the side and end walls 16, 18. This rim defines a downwardly opening channel 22. As shown best in FIGURE 3, the container rim 20 includes an upper, normally horizontal wall 24 which is integrally joined along its inner edge to the upper edges of the container side and end walls 16, 18, and an outer lip or flange 26 which depends from and is integrally joined to the outer edge of the upper rim wall 24. The rim channel 22, then, is defined by the upper portions of the container side and end walls, the upper rim wall 24 and the outer rim flange 26.

Extending across the open top of the container body 12, between its side walls 16, are a pair of relatively rigid stacking supports or bails 28. These bails may be conveniently fabricated from metal rods. Each bail 28 includes a relatively straight central supporting section 30 and downwardly, inwardly, and upwardly turned end portions 32. Each of these bail end portions includes a downwardly extending segment 32a generally normal to the central supporting section 30 of the bail, an inwardly extending segment 32b spaced from and generally paralleling the supporting section, and an upwardly extending segment or extremity 32c generally normal to the supporting section and spaced inwardly from the downwardly extending segment 32a. The bail extremities 32c terminate in spaced relation to the central bail section 30 to define therebetween gaps 34.

The stacking bails 28 are installed on the container body 12 in such a way that the central supporting sections 30 of the bails rest on the upper surface of the container rim 20. The bail end portions 32 extend downwardly across the rim flange 26, then inwardly below this flange, and finally upwardly into the rim channel 22. It is evident at this point, therefore, that the stacking bails 28 are laterally movable endwise of the container body 12 and are interlocked with the body by virtue of engagement of the upwardly extending bail extremities 32c in the rim channel 22.

Recessed into the upper surface of the container rim 20, along each longitudinal side thereof, are a pair of upwardly opening, generally semi-cylindrical bail seats 36. The corresponding bail seats at opposite sides of the container, that is the two bail seats adjacent each end of the container, are coaxially aligned laterally of the container to form a seat pair. The bail seats 36 are adapted to receive the stacking bails 28 in their positions of FIGURE 6 and serve to restrain the bails against lateral movement from these positions. The bail seats also permit removal and replacement of the bails as mentioned earlier and hereinafter explained. As may be readily observed in the drawings, the bail seats of the respective seat pairs are spaced inwardly a distance from the adjacent container end walls 18 such that when the stacking bails 28 are positioned in the seats, the bails are located a distance inwardly from the ends of the container bottom wall 14 and thus overlie the latter wall. Recessed into the undersurface of the bottom wall are downwardly opening, generally semi-cylindrical bail seats 38 which extend laterally of the container and are vertically aligned with the upper bail seats 36, respectively, as shown. The purpose of the lower bail seat 38 will be explained presently.

Figure 10:
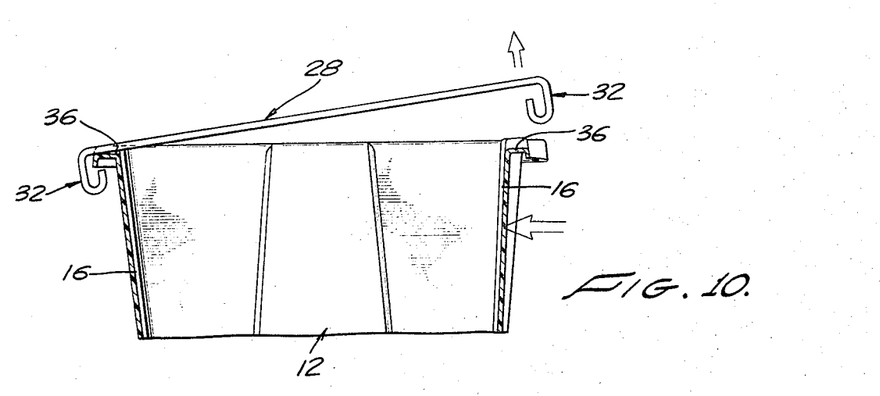
FIGURE 10 is a transverse vertical section through the container in FIGURE 1 illustrating the manner in which each stacking bail is removed from and replaced on the container.
Figure 11:
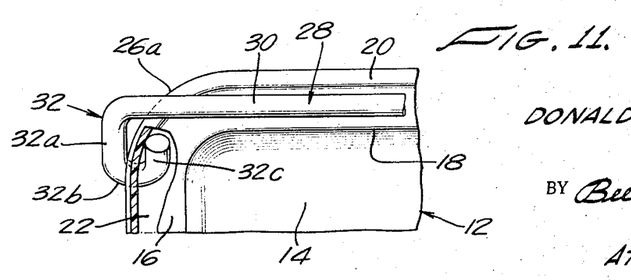
FIGURE 11 is an enlarged plan view, partly in section, taken on line 11—11 in FIGURE 9.
Figure 12:
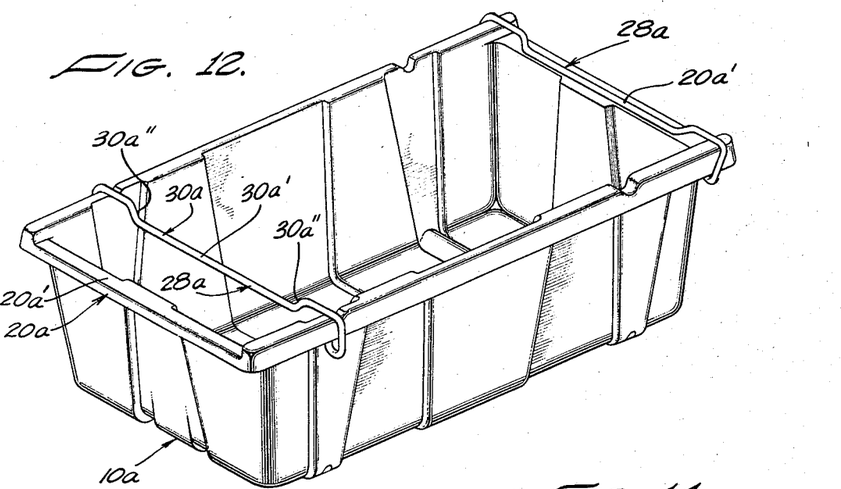
FIGURE 12 is a perspective view of a modified stacking and nesting container according to the invention.
Figure 13:
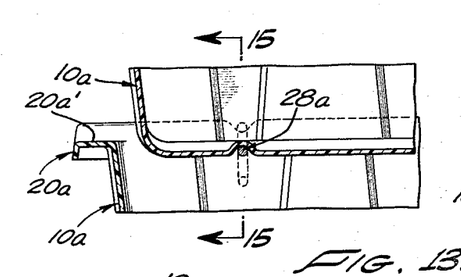
FIGURE 13 is a fragmentary vertical section through two containers of the kind illustrated in FIGURE 12 showing the containers disposed in stacked relation.
Figure 14:
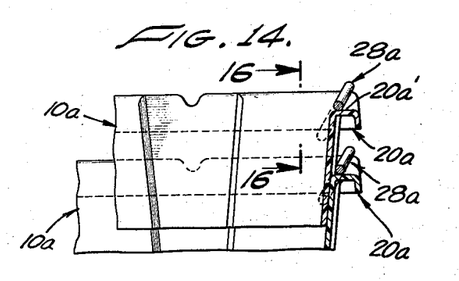
FIGURE 14 is a fragmentary vertical section through two containers of the type illustrated in FIGURE 12 showing the containers disposed in nesting relation.

It is signficant to note at this point that the vertical width dimension Z (FIGURE 5) of the rim flange 26, at all positions along the sides of the container except in line with the bail seats 36, is substantially greater than the width X' of the stacking bail gaps 34 but less than the spacing Z' between the central sections 30 and the inturned end segments 32b of the bails. It is evident, therefore, that the stacking bails 28, while laterally movable endwise of the container, are interlocked with the container rim 20 in such a way as to preclude the possibility of accidental or inadvertent separation of the bails from the container. On the other hand, the vertical width dimension X of the rim flange 26 in vertical planes containing the axes of the bail seats 36, respectively, is less than the width X' of the stacking bail gaps 34. This latter dimensional relationship permits removal of the stacking bails 28 from the container and replacement of the bails on the container at the bail seats. Thus, to remove a stacking bail 28 from the container, the bail is positioned in its respective bail seats 36 and the container side walls 16 are deflected inwardly toward one another, as shown in FIGURE 10, to cause relative inward movement of at least one side of the rim flange 26 through the adjacent stacking bail gap 34 to a position wherein the adjacent bail extremity 32c is located outwardly of the flange. The corresponding end of the bail is then rotated upwardly to the position of FIGURE 10 above the container rim 20, after which the opposite end of the bail is disengaged from the rim. The bail is replaced on the container by reversing this procedure. Thus, the bail seats 36 serve the dual function of retaining the stacking bails against endwise movement along the container and permitting removal of the bails from and replacement of the bails on the container.

The positions occupied by the stacking bails 28 when the latter are in their respective bail seats 36 are their stacking positions. In these stacking positions, the bails are disposed to engage the bottom wall of a similar container, thus to permit a number of the containers to be stacked one on top of the other in the manner illustrated in FIGURES 6 and 8. When a number of the containers are thus stacked, the stacking bails on each container engage in the bottom bail seats 38 in the adjacent upper container, as shown. It is evident, therefore, that the bails and bail seats of the stacked containers cooperate to restrain the adjacent containers against relative endwise movement.

Figure 1:
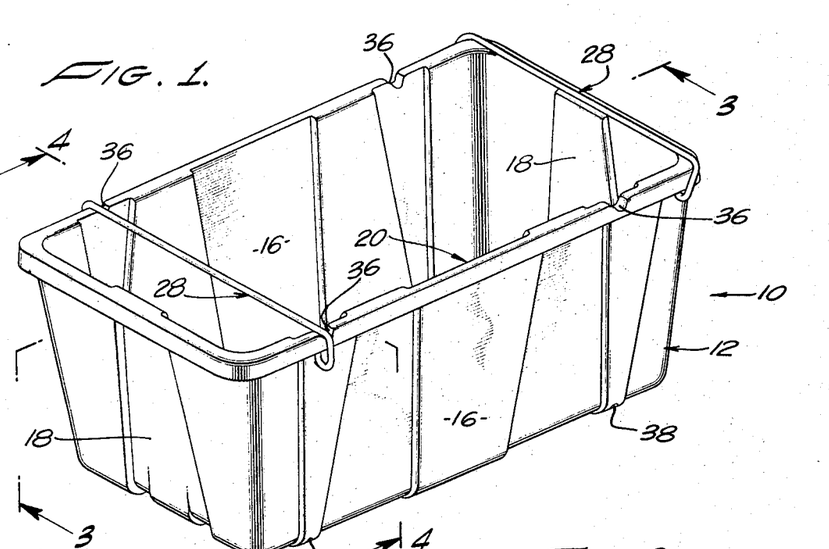
FIGURE 1 is a perspective view of a stacking and nesting container according to the invention illustrating one stacking bail in stacking position and the other stacking bail in nesting position.
Figures 2, 3:
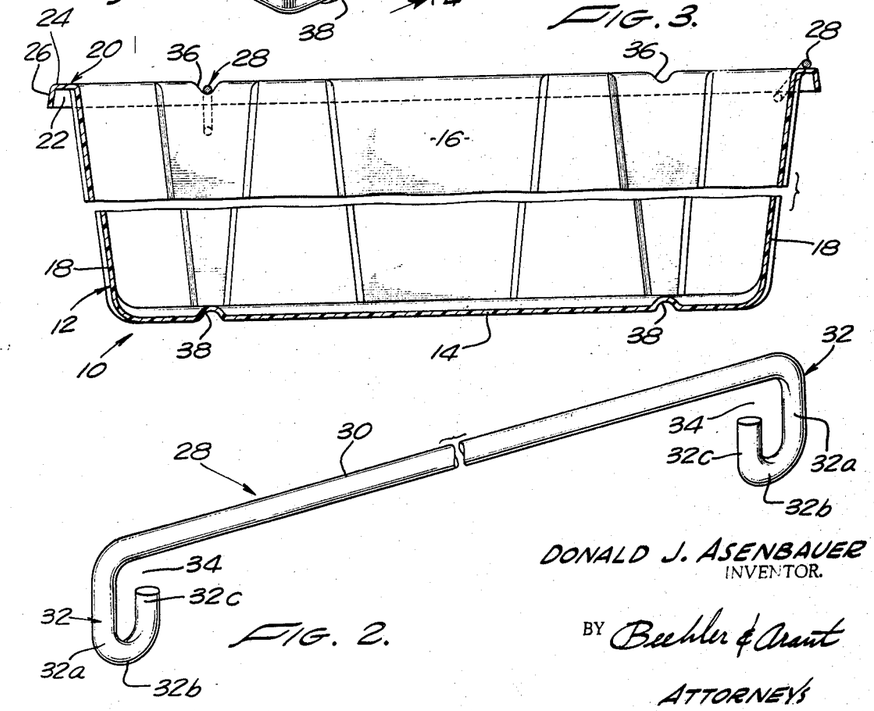
FIGURE 2 is an enlarged perspective view of one of the stacking bails.
FIGURE 3 is a section taken on line 3—3 in FIGURE 1.
Figure 4:
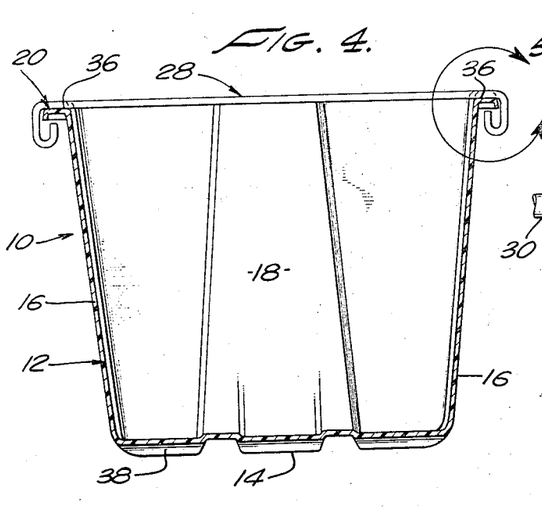
FIGURE 4 is a section taken on line 4—4 in FIGURE 1.
Figure 5:
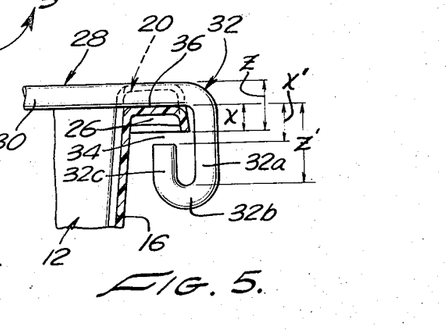
FIGURE 5 is an enlargement of the area encircled by the arrow 5—5 in FIGURE 4 and illustrates, in particular, certain dimensional relationships between the stacking bails and the container rim.
Figure 6:
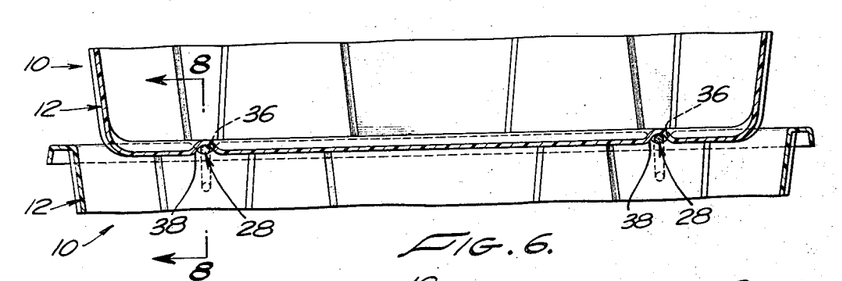
FIGURE 6 is a fragmentary vertical section through two containers disposed in stacked relation.
Figure 7:
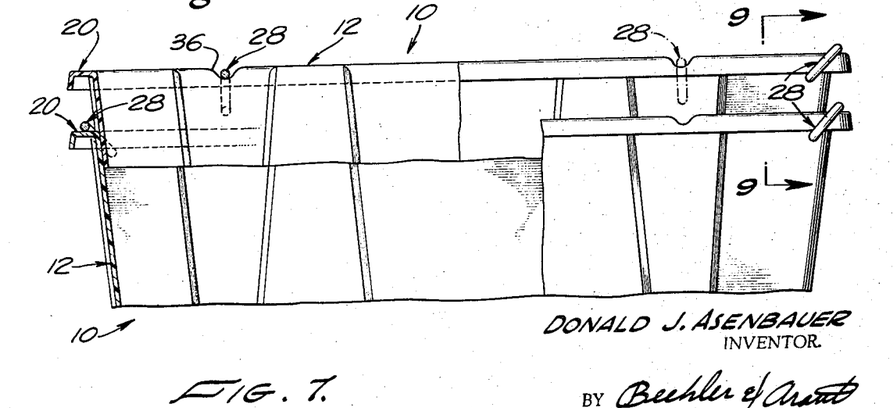
FIGURE 7 is a fragmentary side elevation, partly in section, illustrating two containers disposed in nesting relation.
Figure 8:
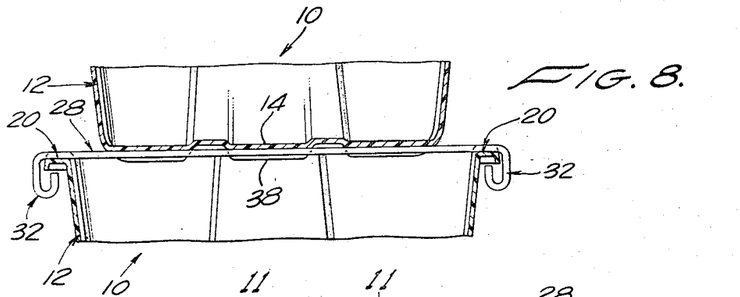
FIGURE 8 is a section taken on line 8—8 in FIGURE 6.
Figure 9:
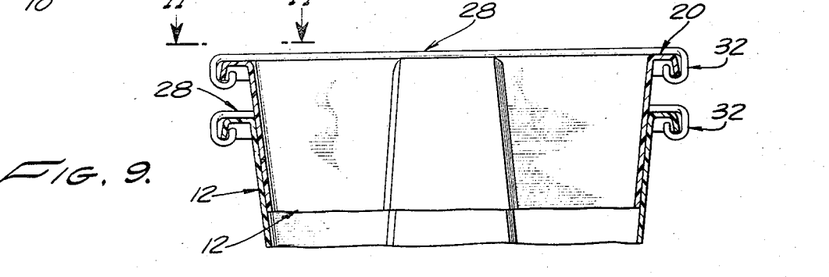
FIGURE 9 is a section taken on line 9—9 in FIGURE 7.

The stacking bails 28 are laterally movable from their stacking positions of FIGURES 6 and 8 towards the adjacent ends of the container body 12 to their nesting positions of FIGURES 7 and 9. In these nesting positions, the central supporting sections 30 of the bails rest on the end portions of the container rim 20, thus to permit the container to receive, in nesting relation, the bottom of a similar container, as shown. Accordingly, when the stacking bails are retracted to their nesting positions, a number of the containers may be nested one inside of the other. A unique feature of the invention resides in the fact that the corner portions 26a of the container rim flange 26 are curved, as shown best in FIGURE 11, in such a way as to prevent movement of the stacking bails 28 endwise of the container to positions wherein the bails would drop over the ends of the container rim 20. Thus, lateral movement of each stacking bail 28 toward the adjacent end of the container is limited, by engagement of the upturned bail extremities 32c with the curved corner portions 26a of the rim flange 26, to the limiting position (nesting position) of FIGURE 11, wherein the central section 30 of the bail rests on the upper wall 24 of the container rim 20, inwardly of the outer edge of the rim, thus to prevent the bail from dropping over the edge of the rim with the resultant disengagement of the bail from the container.

A unique and highly important feature of the invention resides in the fact that downwardly extending segments 32a of the bail end portions 32 define thrust shoulders which are effective to resist outward deflection of the container side walls 16 under load. To this end, the spacing, endwise of each stacking bail 28, between its respective thrust shoulders 32a approximates the upper width of the container body 12, measured laterally of the container between the outer surfaces of the rim flange 26. When a number of the containers are stacked one on top of the other in the manner explained earlier, the stacking load imposed on each container creates lateral forces on the container side walls 16 which tend to deflect these walls outwardly. This deflection of the side walls is limited by engagement of the side portions of the container rim 20 with the bail thrust shoulders 32a. It is significant to note here that the interlocking configuration of the container rim 20 and the bail end portions 32 preclude inadvertent disengagement of the rim from the bail thrust shoulders under load, whereby the stacking strength of the container is maximized.

Figure 15:
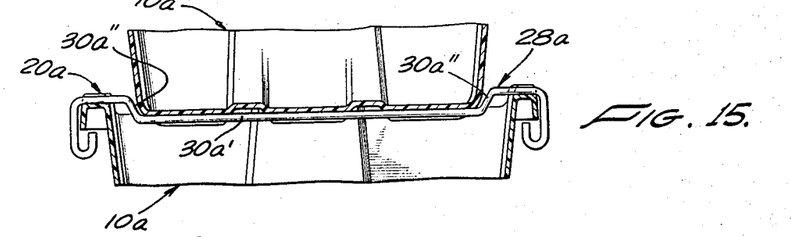
FIGURE 15 is a section taken on line 15—15 in FIGURE 13.
Figure 16:
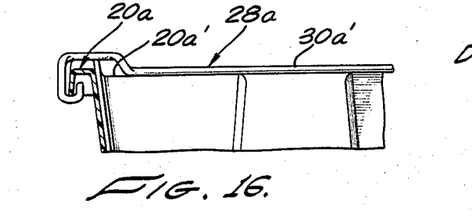
FIGURE 16 is a section taken on line 16—16 in FIGURE 14.

It is obvious that because of the side wall taper of the container body 12, the bottom width of the container is substantially less than the width of the top opening of the container. Accordingly, when one container is stacked on top of another, in the manner shown in FIGURES 6 and 8, the upper container is capable of limited lateral movement relative to the lower container. As a consequence, if a relatively large number of containers were thus stacked, without the exercise of proper care to center each container relative to its adjacent lower container, it is possible that the successive containers might be laterally offset in the same direction relative to their respective adjacent lower containers, thus producing a curvature in the container stack which would render the latter unstable and hence prone to collapsing. In actual practice, this unsafe stacking condition does not normally arise with relatively large containers according to the invention for the reason that the maximum number of such containers which are normally stacked is sufficiently small to preclude the possibility of an unbalanced container stack. Smaller containers, however, may be stacked in such numbers as to create the possibility of an unbalanced or unstable container stack. For this reason, it is desirable, if not essential from the standpoint of safety, to provide smaller containers according to the invention with means for automatically centering the adjacent containers in the stack. To this end, the modified stacking bail configuration of FIGURES 12–16 may be utilized on such smaller containers. The modified stacking bails 28a of the latter figures are identical to the stacking bails 28 described earlier except that the central supporting sections 30a of the modified bails are bent or formed to define central depressed portions 30a' and locating shoulder 30a" at the ends of the depressed portions. The spacing, lengthwise of the stacking bails, between the locating shoulders is made just slightly greater than the bottom width of the containers. When a number of the containers are stacked one on top of the other, the bottom of each container is placed within the central depressed portions of the stacking bails 28a of the adjacent lower container, as shown best in FIGURE 15, thus assuring accurate lateral centering of each container relative to its adjacent lower container. This, in turn, results in an accurately vertical and hence stable and safe container stack.

In those containers which utilize the modified stacking bail configuration just described, it is necessary to modify the container rim to permit retraction of the bails to their nesting positions. Thus, referring to FIGURE 12, it will be observed that the rim 20a of the container 10a which embodies the modified stacking bail is recessed along its ends at 20a'. These recessed ends of the rim provide clearance for the central depressed portions 28a' of the stacking bails 28a when the latter are retracted to their nesting positions of FIGURES 14 and 16.

Figure 17:
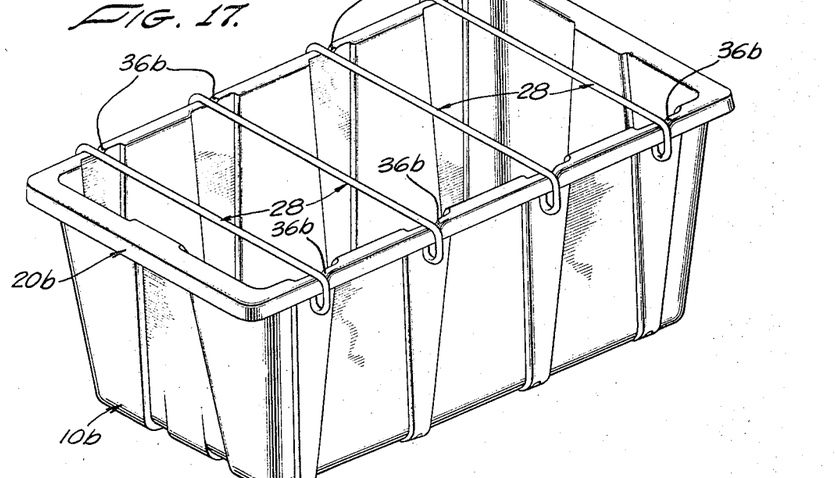
FIGURE 17 is a perspective view of a further modified stacking and nesting container according to the invention.
Figure 18:
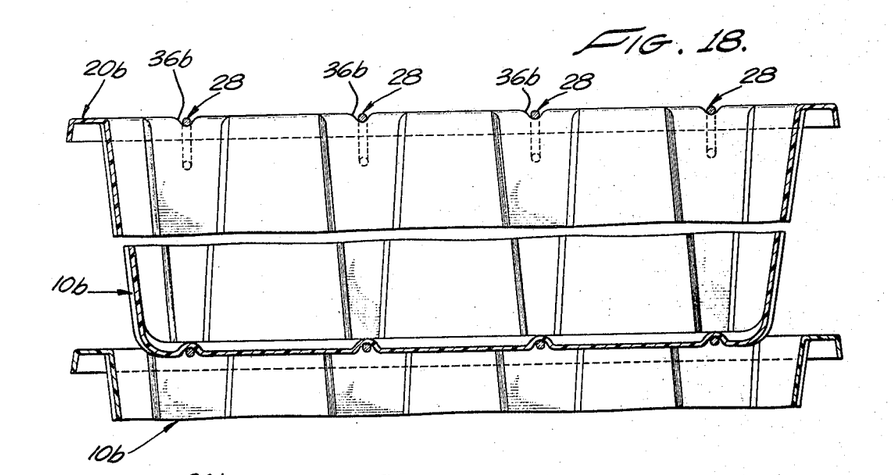
FIGURE 18 is a fragmentary vertical section through two containers of the type illustrated in FIGURE 17 showing the containers disposed in stacked relation.
Figure 19:
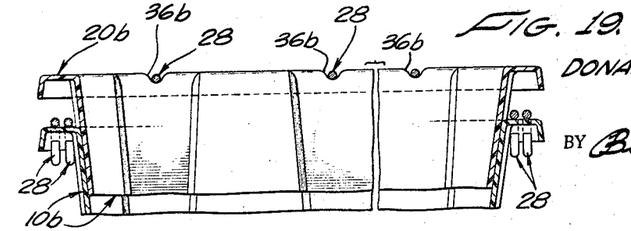
FIGURE 19 is a fragmentary vertical section through two containers of the type illustrated in FIGURE 17 showing the containers disposed in nesting relation.
Figure 20:
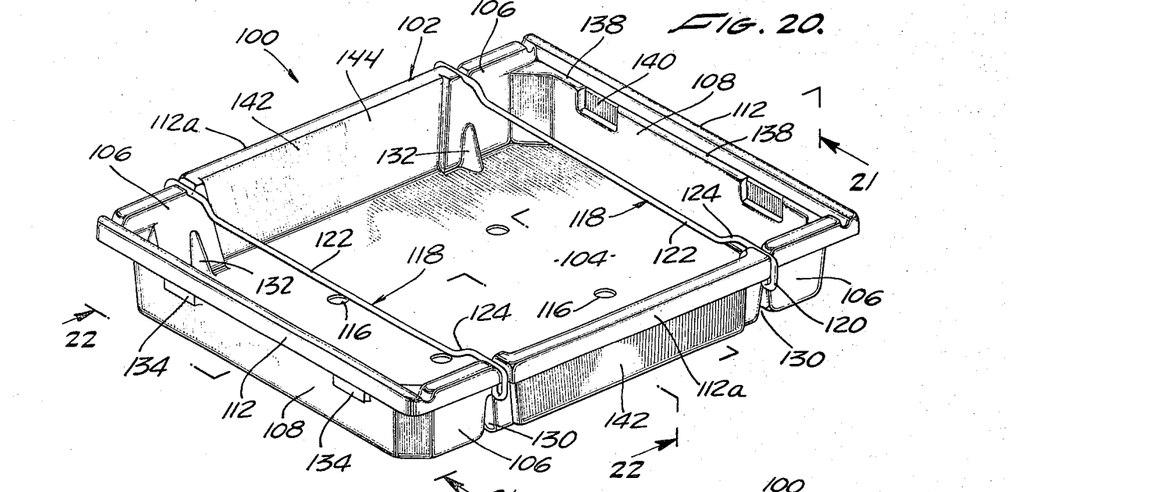
FIGURE 20 is a perspective view of a modified stacking and nesting container according to the invention which is particularly designed for use as a bakery tray, the view showing the stacking bails in their stacking positions.
Figure 21:
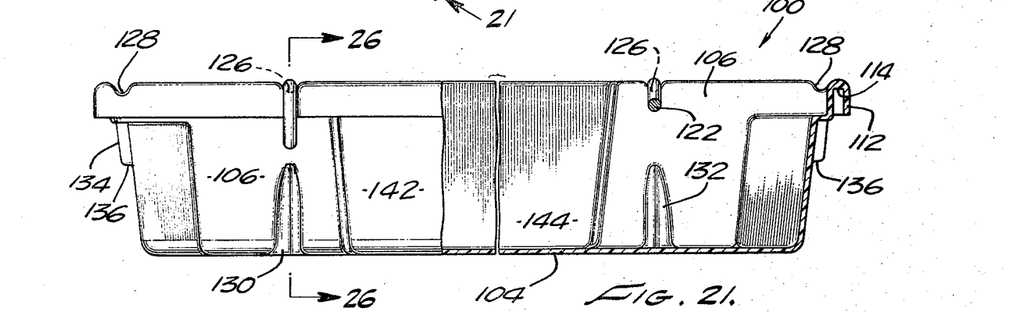
FIGURE 21 is a section taken on line 21—21 in FIGURE 20.
Figure 22:
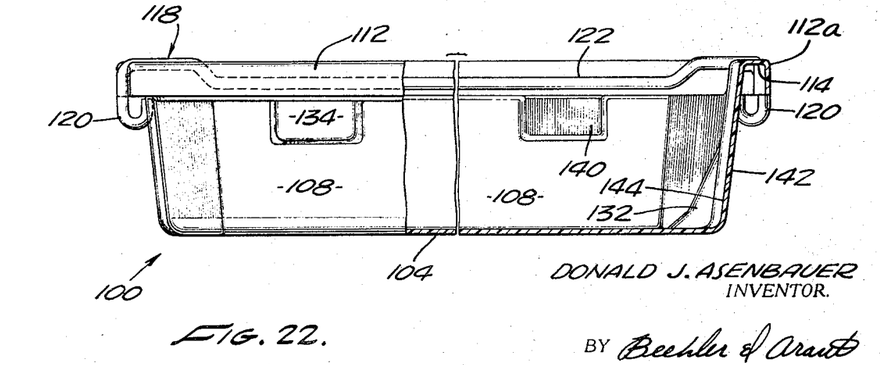
FIGURE 22 is a section taken on line 22—22 in FIGURE 20.
Figures 23, 24:
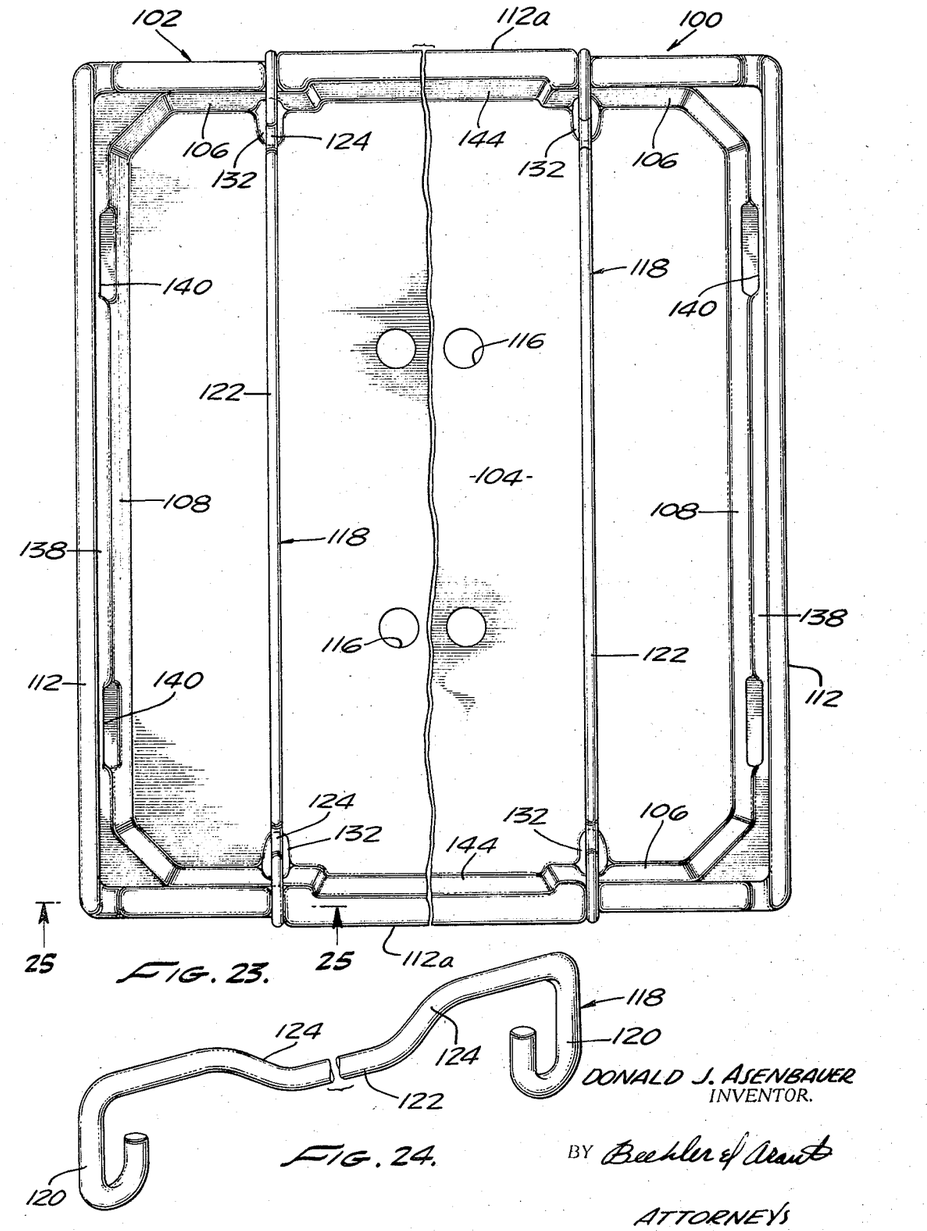
FIGURE 23 is an enlarged top plan view of the modified container.
FIGURE 24 is an enlarged perspective view of one stacking bail of the container.
Figure 25:
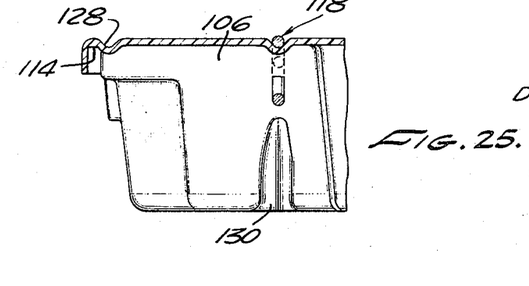
FIGURE 25 is a section taken on line 25—25 in FIGURE 23.

In some cases, it may be desirable or necessary to provide the present stacking and nesting container with more than two stacking bails, thus to reduce the load concentrations at the positions of supporting contact between the bails and container side walls where the stacking loads are transferred from the bails to the container side walls. FIGURES 17–19 illustrates a modified container 10b according to the invention having four stacking bails 28 and four pairs of stacking bail seats 36b in its rim 20b. These bail seats are arranged to locate the stacking bails in their spaced stacking positions of FIGURE 17. The bottom of the modified container has a corresponding number of bottom bail seats 38b which are aligned with the upper bail seats, as shown, thus to permit a number of the containers to be stacked one on top of the other in the manner described earlier, with the stacking bails on each container engaging in the bottom stacking seats of the adjacent upper container, as shown.

The modified stacking and nesting container 10b is conditioned for nesting engagement with other containers by retracting one pair of the stacking bails 28 to nesting positions at the adjacent end of the container and the other pair of stacking bails to nesting positions at the opposite end of the container, in the manner illustrated in FIGURE 19. In order to permit the stacking bails to be retracted in pairs, in this way, to their nesting positions, it may be necessary to increase the width of the container rim 20b at the ends of the container, as shown, thus to permit retraction of the two bails of each pair of their positions of FIGURE 19, wherein the central supporting sections 30 of both bails overlie the adjacent end of the container rim.

In both modifications of the invention illustrated in FIGURES 12–16 and 17–19, the stacking bails are removed from and replaced on the container in the same way as explained earlier in connection with the first embodiment of the invention. Also, the stacking bails, except when positioned relative to the containers for removal and replacement, are interlocked with the container against accidental separation therefrom, all in the same manner as explained earlier.

Attention is now directed to FIGURES 20–34 illustrating a further modified stacking and nesting container 100 according to the invention which is particularly designed for use as a tray for storing and transporting bakery items, such as bread. The modified container or tray may be employed for other purposes, of course. Container 100, like the earlier described containers of the invention, has a rectangular body 102 which may be conveniently fabricated from plastic by a vacuum forming process. Container body 102 has a flat generally rectangular bottom wall 104 perimetrically bounded by upstanding side and end walls 106, 108. The upper portions of these walls are turned outwardly and then downwardly to form a rim 112 about the open top of the container. This rim defines a downwardly opening channel 114 on its under side. In line with its intended use as a bakery tray, the container illustrated is quite shallow compared to the earlier containers of the invention. However, it will become evident as the description proceeds that the depth and other dimensions of the container may be varied to adapt the container to other uses. One significant feature of the container resides in the fact that its bottom wall 104 is flat over virtually its entire area. In this regard, then, the container differs from the earlier described containers whose bottom walls are interrupted by upstanding ribs. The flat bottom of the container 100 is particularly desirable where the container is employed as a bakery tray for the reason that it avoids indentation of bakery products contained in the tray as would occur with the ribbed bottom walls of the earlier containers. The bottom wall 104 has openings 116 through which a finger may be inserted to aid removal of bakery products from the tray.

The modified container 100, like the earlier containers of the invention, is adapted to be both stacked and nested with other similar containers. To this end, the container 100 is equipped with a pair of stacking bails 118 which are identical to the bails 30a of the container illustrated in FIGURES 12–16. Bails 118 extend between the container side walls 106 and have downwardly, inwardly, and upwardly turned end portions 120 which extend downwardly across, then inwardly under, and finally upwardly into the lower channel 114 of the container rim 112. The central supporting sections 122 of the bails are offset downwardly relative to the bail ends to define the bail locating shoulders 124. Bails 118 are laterally movable endwise of the container 100 between their stacking positions of FIGURES 20–28 and their nesting positions of FIGURES 29–33. Recessed into the upper surface of the container rim 112, along the side wall portions of the rim, are inner and outer bail seats 126, 128 which receive the ends of the bails when in their stacking and nesting positions, respectively. The inner bail seats 126 are located about midway between the center and ends of the container. The outer bail seats 128 are located directly adjacent the container end walls 110.

It will be observed that the container 100 is stacked and nested with other like containers in much the same way as the earlier described containers. Thus, when stacking a number of the containers 100, the container bails 118 are placed in their stacking positions and the containers are placed one on top of the other in such a way that the bottom wall 104 of each upper container rests on the central supporting sections 122 of the bails on the adjacent lower container. When nesting a number of the containers, the bails are moved to their nesting positions and the containers are telescoped one inside of the other in such a way that the bottom of each upper container fits within the interior of the adjacent lower container and between the bails of the latter container. The modified container 100, however, does possess certain unique features, not present in the earlier described containers, which provide a locating function when stacking and an anti-wedging action when nesting a number of the modified containers.

With regard to the locating function during stacking, it is significant to recall that the bottom walls of the earlier containers have grooves or channels in their under surfaces which are designed to receive the bails on an adjacent lower container in a container stack for the purpose of locating the adjacent containers relative to one another in their endwise direction and preventing relative endwise shifting of the containers, thus to assure a vertical and stable container stack. These grooves are eliminated in the container 100 in order to eliminate the bottom wall ribs which are created by the grooves. As already noted, such ribs are eliminated to provide the bottom container wall 104 with a flat upper surface over virtually its entire area which will not indent bakery products placed in the container. In place of locating grooves across the underside of its bottom wall, the container 100 is formed with locating recesses 130. These recesses enter the lower longitudinal junctures of the container bottom and side walls 104, 106 in such a way that the recesses open laterally through the outer surfaces of the side walls and downwardly through the undersurface of the bottom wall. As shown best in FIGURE 20, the locating recesses define generally triangular rib formations 132 within the container. However, the rib formations are relatively small and are located along the longitudinal edges of the bottom wall 104 and thus do not produce any appreciable indentation of bakery products placed in the container. The locating recesses 130 are situated directly below the inner bail seats 126.

Figures 26, 28:
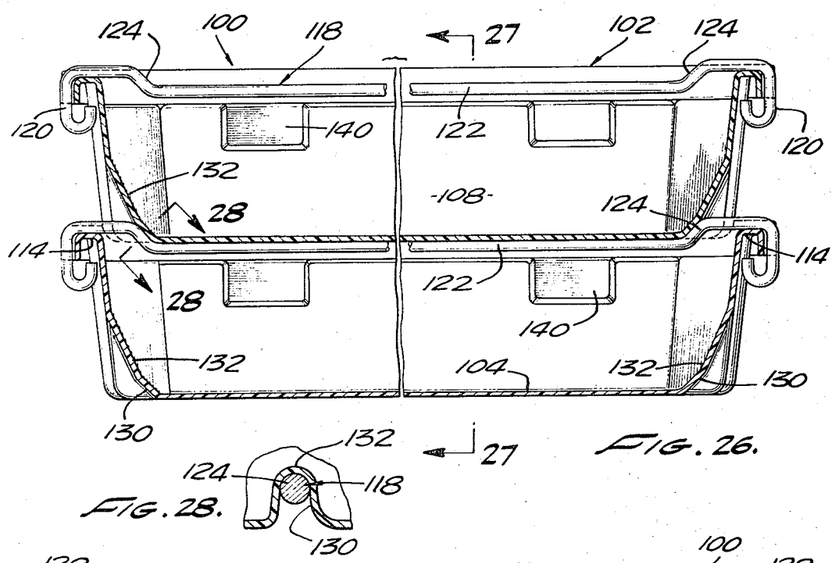
FIGURE 26 is a longitudinal section taken through two modified containers stacked one on top of the other.
FIGURE 28 is an enlarged section taken on line 28—28 in FIGURE 26.
Figure 27:
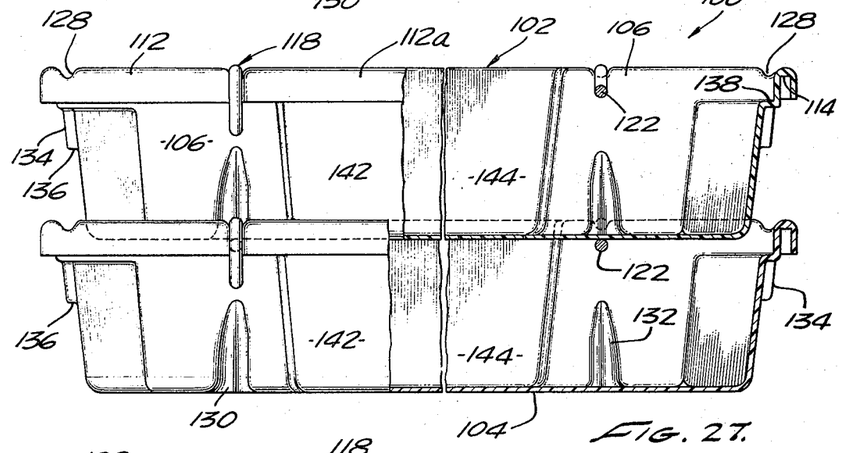
FIGURE 27 is a section taken on line 27—27 in FIGURE 26.
Figure 29:
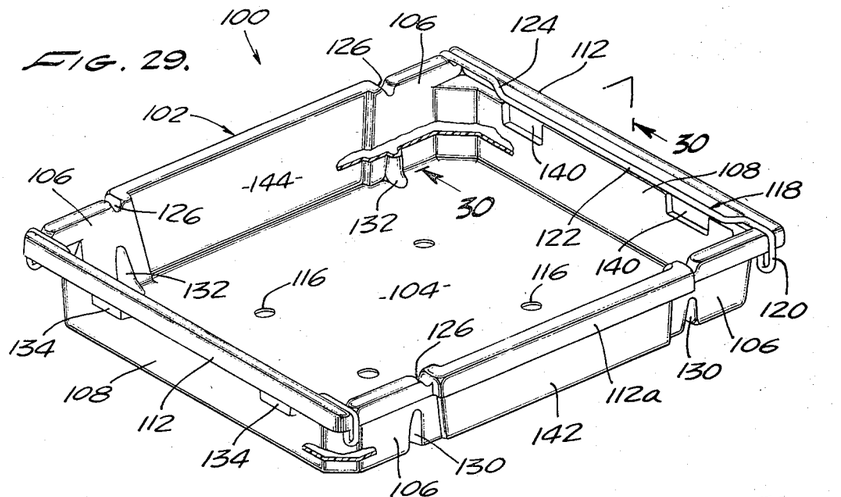
FIGURE 29 is a perspective view of the modified container with its stacking bails located in nesting position.
Figure 30:
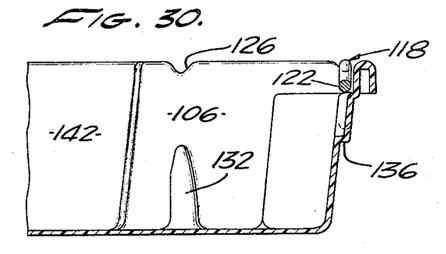
FIGURE 30 is a section taken on line 30—30 in FIGURE 29.

Referring to FIGURES 26 and 28, it will be observed that the stacking bails 118 and locating recesses 130 are sized and shaped in such a way that when one container 100 is stacked on top of another, the locating shoulders 124 of the bails on the lower container engage within the locating recesses in the upper container and seat against the bottom walls of the recesses, adjacent lower ends of these walls. The bail shoulders and the lower portions of the recess walls against which the shoulders seat are inclined at the same angle, such that the shoulders and walls will engage one another along the entire inclined length of the shoulders. In FIGURE 28, it will be observed that the bail shoulders fit snugly between the side walls of the locating recesses. As already noted and shown in FIGURE 26, the flat bottom wall 104 of the upper container rests in the offset central sections 122 of the bails on the lower container. It is now evident that when a number of the containers 100 are stacked, the adjacent containers are positively located relative to one another in both their lateral and endwise directions by interengagement of the bail locating shoulders 124 and locating recesses 130 on the containers.

Referring now to FIGURES 29 to 33, it will be seen that a number of modified containers 100 may be nested, when empty, by shifting their stacking bails 118 outwardly to their nesting positions and placing the containers one on top of the other in such a way that the bottom of each upper container telescopes within the open top of the adjacent lower container, between the bails of the latter container. In this regard, it will be noted that the container side and end walls 106, 108 have a slight taper such that they may be nested in this way. As mentioned earlier, a feature of the modified container resides in an anti-wedging action which is effective during nesting. This anti-wedging action prevents frictional wedging of the interfitting containers and thereby enables the containers to be easily separated. To this end, the container end walls 108 are recessed outwardly adjacent their upper edges to provide the end walls with outer projecting nesting shoulder formations 134. Each end wall has a pair of the shoulder formations which are located about midway between the longitudinal centerline and side walls 106 of the container. These shoulder formations define downwardly presented shoulder surfaces 136 located in a common plane parallel to and spaced a distance above the bottom container wall 104. Above the shoulder formations 134, the container end walls 108 are stepped outwardly a distance slightly greater than the projection of the shoulder formations. Ledges 138 are thus formed along the inner sides of the end walls just above the shoulder formations and a short distance below the level of the container rim 112. The inner end wall recesses 140 defined by the shoulder formations open upwardly through these ledges, as shown. Referring particularly to FIGURES 20, 23, 29, 30, and 31, it will be observed that the inner bail seats 126 in which the stacking bails 118 engage in their nesting positions are situated at the ends of the end wall ledges 138. It will be further seen that the vertical offset of the central bail sections 122 is slightly less than the vertical spacing between the ledges and the bottoms of the inner bail seats. Accordingly, when the stacking bails 118 are placed in their nesting positions, the central bail sections 122 extend along the ledges 138, just above the upper ledge surfaces, and over the nesting shoulder formations 134.

Figure 31:
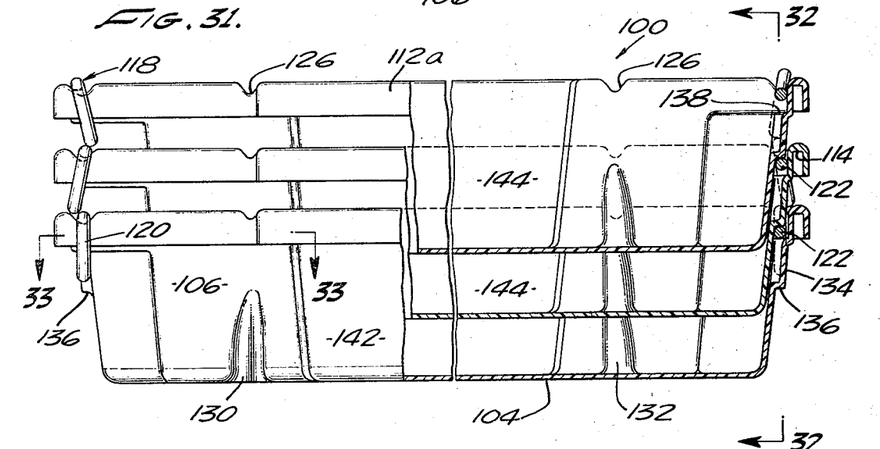
FIGURE 31 illustrates a number of the modified containers disposed in nesting engagement.
Figure 32:
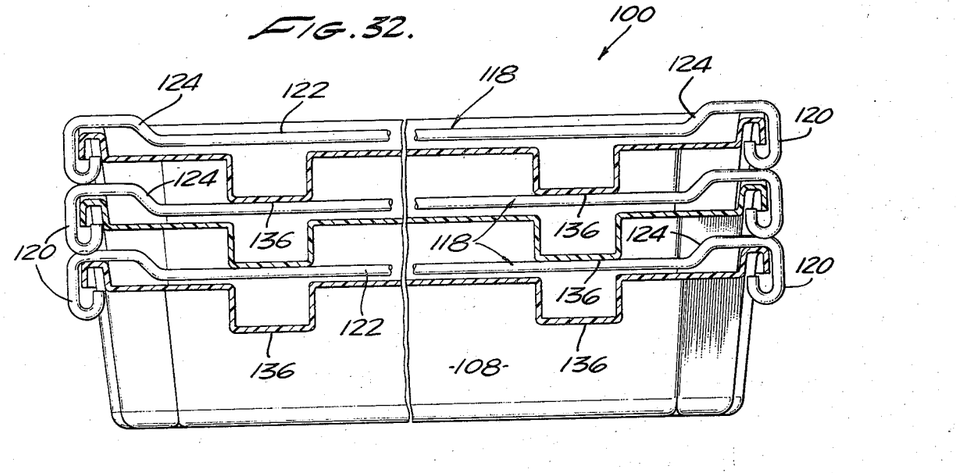
FIGURE 32 is a section taken on line 32—32 in FIGURE 31.
Figure 33:
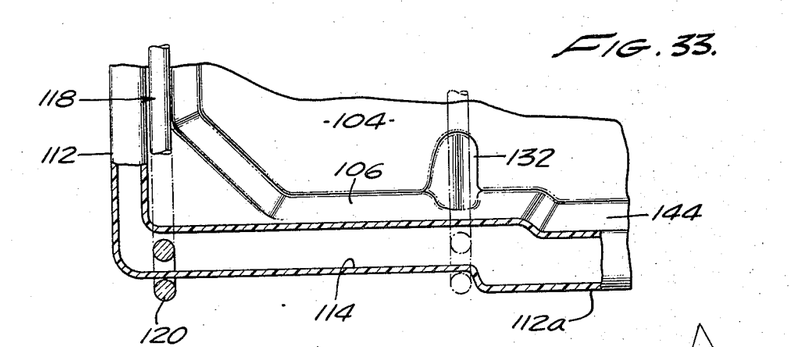
FIGURE 33 is an enlarged section taken on line 33—33 in FIGURE 31.
Figure 34:
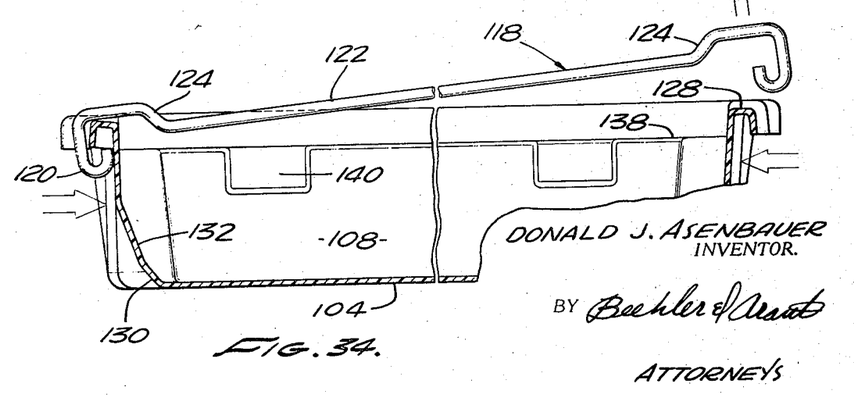
FIGURE 34 is a vertical section through the modified container illustrating a manner in which its stacking bails are removed from the container.

When a number of the containers 100 are placed in nesting engagement, the nesting shoulders 136 of each container rest on the central sections 122 of the stacking bail 118 on the adjacent lower container in the manner illustrated best in FIGURES 31 and 32. This supporting engagement of the nesting shoulders on each container with the bails on the adjacent lower container prevents wedging of the adjacent interfitting containers and thus permit easy separation of the containers. At this point, attention is directed to the left hand side of FIGURE 31. It will be observed in this figure that the bent ends 120 of the stacking bails 118 on adjacent containers cant to abut one another when the containers are nested and thereby prevent full nesting engagement of the containers. However, since the contacting surfaces of the bail ends are rounded, these ends cam one another laterally in random fashion, as shown, to positions wherein the bail ends clear one another to permit full nesting engagement of the containers.

In the earlier described containers of the invention, the side wall portions of the container rims are straight along their entire length, and the bent ends of the stacking bails project beyond the rims a distance approximating the diameter of the bail rods. This projection of the bail ends poses a problem when a number of the containers are stacked or nested side by side. The problem referred to resides in the fact that the projecting bail ends in adjacent container stacks interfere with one another, that is the bail ends catch on one another, when two adjacent container stacks are moved relative to one another in the endwise direction of the containers during insertion of a container stack into or withdrawal of a container stack from the space between its adjacent containers. This problem may be alleviated to some degree, of course, by leaving spaces between the adjacent container stacks sufficient to prevent interference of the projecting bail ends. However, such spaces provide clearance for the container stacks to shift relative to one another which is undesirable, particularly when the containers are stacked in a cargo vehicle for transportation from one location to another.

The modified container 100 of the invention avoids the above discussed problem by stepping the side wall portions of the container rim 112 outwardly in the region between the inner stacking bail seats 126 a distance such that the outer surfaces of the stepped rim portions 112a are substantially flush with the outer projecting ends of the container stacking bails 118. In this regard, it will be observed that the rim portions 112a are stepped outwardly a distance equal to or slightly greater than the diameter of the metal rods from which the stacking bails are fashioned. In the particular container illustrated, the container side walls 106 are also stepped outwardly in the region between the inner bail seats 126 and below the stepped rim portions 112a to provide vertically tapered projecting side wall formations 142 at the outer sides of the container side walls and corresponding vertically tapered recesses 144 at the inner sides of these walls.

It is now evident that a number of the modified containers 100 may be stacked or nested side by side with the outwardly stepped rim portions 112a of the containers in adjacent container stacks abutting one another so as to positively retain the stacks against shifting relative to one another. When the containers are thus stacked or nested, any selected container stack may be easily withdrawn from or inserted into the space between its adjacent container stacks without interfering with the projecting ends of the stacking bails in the adjacent container stack. Referring to FIGURES 29 through 33, it will be observed that when the containers are nested one inside of the other, the projecting side wall formations 142 of each upper container fit within the inner side wall recesses 144 of the adjacent lower container to locate the adjacent containers relative to one another in their endwise direction. This locating function is aided by the illustrated beveled corners of the container which are arranged to engage the beveled corners of the adjacent containers in a stack of nesting containers.

As in the previous embodiment of the invention, the stacking bails 118 are removable from the container body 102. This removal, as well as reassembly of the stacking bails on the container body, is accomplished by aligning the bails with their inner bail seats 126 and then deflecting the container side walls 106 inwardly in the manner shown in FIGURE 34.

It is now obvious, therefore, that the invention herein described and illustrated is fully capable of attaining the several objects and advantages preliminarily set forth.

While certain presently preferred embodiments of the invention have been disclosed for illustrative purposes, it is obvious that modifications of the invention are possible within the spirit and scope of the following claims.

What is claimed as new in support of Letters Patent is:

1. A stacking and nesting container comprising:
   a container body including a bottom wall perimetrically bounded by upstanding side and end walls and an outwardly directed rim about the upper edges of said side and end walls, said rim defining a downwardly opening channel;
   and a pair of relatively rigid stacking bails extending across the top of said container between said side walls;
   said stacking bails having downwardly and inwardly turned end portions including upturned extremities engaging in said channel to interlock said bails with said container body, while permitting lateral movement of said bails endwise of said container between nesting positions adjacent the respective end walls wherein said container is conditioned to receive in nesting relation the bottom of a similar container, and stacking positions spaced inwardly from said end walls wherein said bails are disposed for stacking engagement with the bottom wall of said similar container.

2. A container according to claim 1 wherein:
   said container body is constructed of a flexible material,
   said rim comprises an upper normally generally horizontal wall extending outwardly from the upper edges of said side and end walls and a flange depending from the outer edge of said upper rim wall,
   said bails include central supporting sections which extend across the top of said container and rest on said upper rim wall,
   said upturned extremities of each bail terminate in spaced relation to said central section of the respective bail to define gaps therebetween,
   said upper rim wall has two upwardly opening bail seats recessed into its upper surface along each side of said container,
   said bail seats at one side of said container are aligned with the corresponding bail seats at the opposite side of said container to form seat pairs,
   said seat pairs are located inwardly of said container end walls, respectively, to receive said bails when the latter are disposed in said stacking positions, and
   the width of said stacking bail gaps is greater than the vertical width of said rim flange in line with said rim seats but less than the vertical width of said rim flange at all other positions along the sides of said container, whereby said bails may be placed on and removed from said container only at said bail seats.

3. A container according to claim 1 wherein:
   said bails include central supporting sections which extend across the top of said container body and are adapted to rest on the ends of said container rim when said bails are disposed in said nesting positions, and
   said rim includes means at the ends of said container for preventing movement of said stacking bails beyond said nesting positions, thus to prevent said bails from dropping over the ends of said container rim.

4. A container according to claim 3 wherein:
   said rim includes an upper normally generally horizontal wall extending outwardly from the upper edges of said side and end walls and an outer flange depending from the outer edge of said upper rim wall, and
   the corner portions of said rim flange are curved to engage said upturned bail extremities when said bails occupy said nesting positions and define said bail limiting means.

5. A container according to claim 1 including:
   at least one additional stacking bail on said container,
   said stacking bails have central supporting sections extending across the top of said container, and
   two of said stacking bails being adapted for movement endwise to the same end of said container to nesting positions wherein said central supporting sections of said two bails overlie and rest on the adjacent end of said container rim.

6. A container according to claim 5 wherein:
   the upper surfaces of said rim has recessed upwardly opening bail seats along each side of said container,
   bail seats at one side of said container are aligned with the corresponding bail seats along the opposite side of said container to form seat pairs which are uniformly spaced along said container and equal in number to said stacking bails, and
   said seat pairs being adapted to receive said stacking bails, respectively, for locating the latter in stacking positions.

7. A container according to claim 1 wherein the upper surface of said rim has two upwardly opening bail seats along each side of said container, the bail seats at one side of said container are aligned laterally of the container with the corresponding bail seats at the opposite sides of the container to form seat pairs, and said seat pairs are located inwardly of the respective end walls of the container so as to receive respective ones of said bails when said bails are disposed in said stacking positions.

8. A stacking and nesting container comprising:
   a one-piece molded plastic body having a bottom wall bounded by upstanding, upwardly divergent side and end walls, the upper edges of said side and end walls forming an outwardly directed rim and a downwardly directed rim flange which cooperatively define a downwardly opening channel;
   a pair of relatively rigid stacking bails extending across the top of said container and resting upon said side wall rims, said stacking bails having downwardly and inwardly turned end portions which include upturned extremities that engage in said channel to interlock said bails with said container body;

the upper surface of said rim having two upwardly opening bail seats along each side of said container, the bail seats at one side of said container being aligned laterally of the container with the corresponding bail seats at the opposite sides of the container to form seat pairs, and said seat pairs being located inwardly of respective end walls of the containers;

said bottom wall having a pair of upstanding reinforcing rib formations extending generally normal to said side walls and defining downwardly opening channels in the underside of said bottom wall;

and each of said reinforcing rib formations being vertically aligned with one of said bail seat pairs;

whereby said bails may occupy a stacking position in which they rest in said bail seat pairs and engage the reinforcing rib formations of a superimposed container, or may occupy a nesting position in which they rest upon the respective end wall rims of the container.

9. In combination:
a container having a pair of uprising generally parallel side walls formed of resilient plastic material, the upper extremities of said walls being outwardly turned to form rims and then downwardly turned to form rim flanges, said rims and flanges forming downwardly opening channels;

at least one movable bail consisting of a rigid metal rod adapted to extend horizontally across and rest upon said rims, the ends of said bail being turned vertically downward and thereafter curved inwardly and then upwardly so that the extremities thereof extend into and engage said channels;

said bail being slidable endwise of said container and being retained thereon by the engagement of its said extremities in said channels.

10. The combination claimed in claim 9 wherein each wall rim is recessed in its upper surface to provide a bail seat, said two bail seats being aligned with each other, the extremities of said bail forming gaps with the main bail portion whose width is more than the vertical width of said rim flanges at said bail seats but less than the vertical width of said rim flanges at other locations, whereby said bail may be removed from said container at said bail seats.

11. A container comprising:
a one-piece molded plastic body having a bottom wall bounded by upstanding, upwardly divergent side and end walls, the upper edges of said side and end walls forming an outwardly directed rim and a downwardly directed rim flange which cooperatively define downwardly opening channels, the upper surface of said rim having two upwardly opening bail seats along each side of said container, the bail seats at one side of said container being aligned laterally of the container with the corresponding bail seats at the opposite sides of the container to form seat pairs, and said seat pairs being located inwardly of respective end walls of the container;

said bottom wall having a pair of upstanding reinforcing rib formations extending generally normal to said side walls and defining downwardly opening channels in the underside of said bottom wall;

and each of said reinforcing rib formations being vertically aligned with one of said bail seat pairs.

12. A container according to claim 1 wherein:
the upper surface of said bottom wall is substantially flush over virtually its entire area, said container body has locating recesses which enter the lower longitudinal corner junctures of said bottom and side walls in planes substantially normal to said lateral walls and open through the underside of said bottom wall and the outer sides of said side walls, said bails have downwardly offset central sections between said side walls and inwardly presented locating shoulders at the ends of and extending upwardly from said central sections, and said bails when in stacking position are disposed in said planes, respectively, to permit a number of said containers to be stacked one on top of the other in such a way that the bottom wall of each upper container rests on said central sections of the bails on the adjacent lower container and said locating shoulders of each bail engage within and seat against the bottom walls of said locating recesses of the adjacent upper container to locate the adjacent containers relative to one another in their lateral and endwise directions.

13. A container according to claim 1 wherein:
said end walls are recessed outwardly adjacent their upper edges to provide projecting nesting shoulder formations at the outer sides of said end walls having lower downwardly presented shoulder surfaces disposed in a common plane parallel to and spaced above said bottom wall, and said end walls are stepped outwardly above said shoulder formations a distance slightly greater than the projection of said shoulder formations, and said stacking bails when in their nesting positions extend over said shoulder formations to permit a number of said containers to be nested one inside of the other in such a way that said nesting shoulder surfaces on each upper container rest on the stacking bails of the adjacent lower container to prevent wedging of the adjacent interfitting containers.

14. A container according to claim 1 wherein:
the side wall portions of said container rim located between said stacking bails when the latter are disposed in their stacking positions are stepped outwardly a distance at least substantially equal to the endwise projection of said bails beyond the remaining side wall portions of said rim, whereby a number of said containers may be stacked or nested side by side with said stepped rim portions of the containers in adjacent container stacks abutting one another to prevent relative shifting of the container stacks without interference of the projecting ends of the bails in adjacent container stacks.

References Cited

UNITED STATES PATENTS

| | | | |
|---|---|---|---|
| 2,029,746 | 2/1936 | Tufts | 220—97 |
| 2,791,365 | 5/1957 | Cohen | 220—97 X |
| 3,169,659 | 2/1965 | Blackmore | 220—97 |

FOREIGN PATENTS 1,164,911  10/1958  France.

GEORGE E. LOWRANCE, *Primary Examiner.*